UNITED STATES PATENT OFFICE.

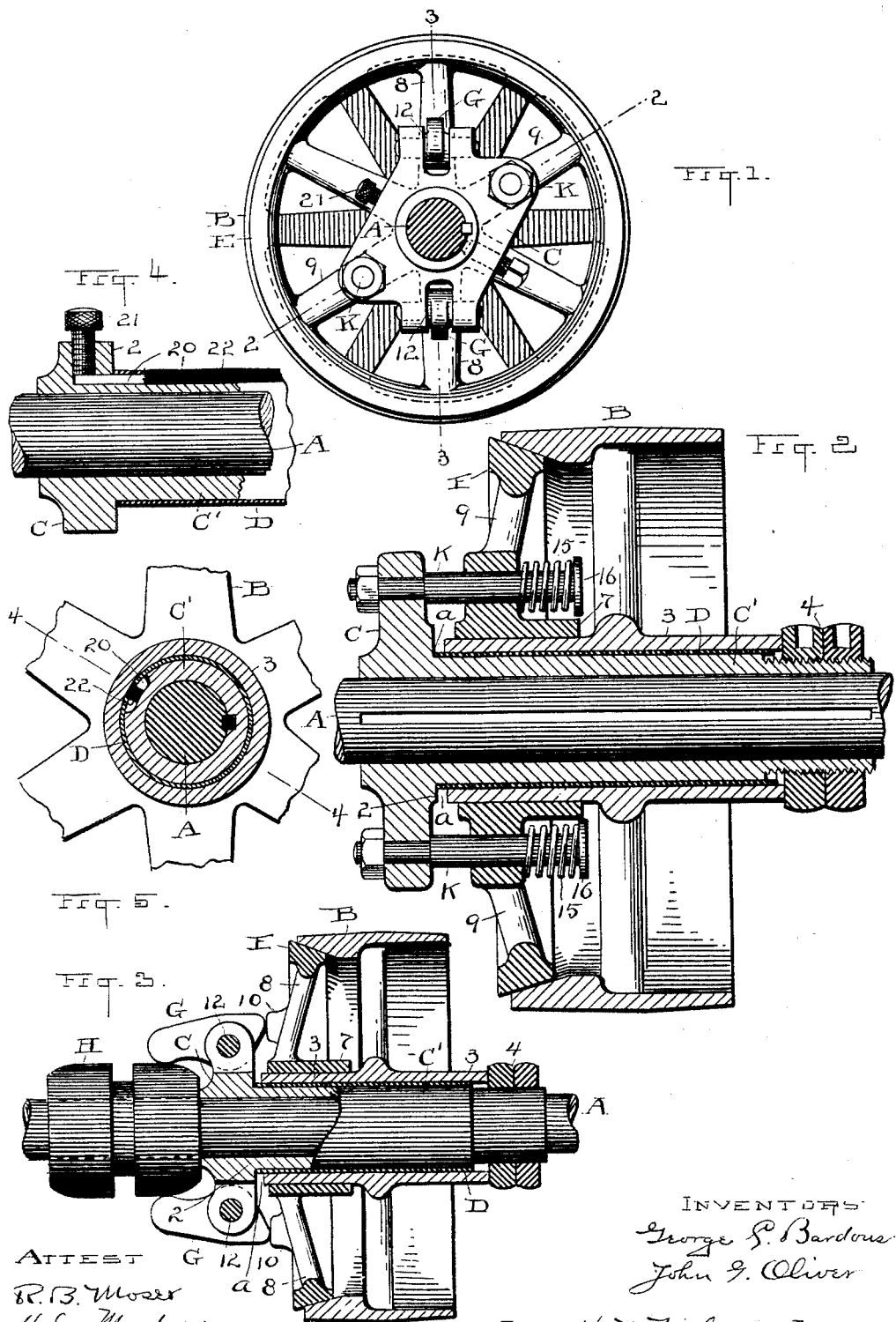

GEORGE C. BARDONS AND JOHN G. OLIVER, OF CLEVELAND, OHIO.

FRICTION-CLUTCH.

SPECIFICATION forming part of Letters Patent No. 586,832, dated July 20, 1897.

Application filed July 6, 1896. Serial No. 598,117. (No model.)

*To all whom it may concern:*

Be it known that we, GEORGE C. BARDONS and JOHN G. OLIVER, citizens of the United States, residing at Cleveland, in the county of Cuyahoga and State of Ohio, have invented certain new and useful Improvements in Friction-Clutches; and we do hereby declare that the following is a full, clear, and exact description of the invention, which will enable others skilled in the art to which it appertains to make and use the same.

Our invention relates to improvements in friction-clutches; and the invention consists in the construction and combination of parts substantially as shown and described, and particularly pointed out in the claims.

In the accompanying drawings, Figure 1 is a side elevation of our improved clutch mechanism corresponding to a view looking in from the left of Fig. 2. Fig. 2 is a sectional elevation of the parts on line 2 2, Fig. 1, and Fig. 3 is a cross-section on line 3 3, Fig. 2. Fig. 4 is a longitudinal section, and Fig. 5 a cross-section, of the shaft and parts thereon and designed to show means for lubricating the pulley-bearings, as hereinafter fully described.

A represents a shaft, and B a pulley free to rotate on said shaft, except as it is engaged therewith through the clutch mechanism; but intermediate of the said shaft and pulley are the sleeve C', projecting from head C, and the sleeve D. The sleeve C' is immediately upon the shaft and is splined or keyed thereon, so as always to turn therewith, and being usually of cast metal we deem it desirable to place over the same a thin bearing or wearing sleeve D of some suitable hard metal, which also contributes to forming a lubricating-pocket, as hereinafter fully described. The hub 3 of the pulley B is not only engaged over the said sleeve D, but extends out beyond the same a slight distance, and a nut or nuts 4 on the extremity of sleeve C serve as a stop or thrust for the pulley in that direction. Another material advantage of this construction is found in connection with counter-shafts, where these pulleys are most commonly employed. Usually it is necessary to stop the pulley and remove the belt before the frictional parts can be adjusted to one another, but with this improvement the nuts 4 can be adjusted while the belt remains in place, which is a material advantage.

It will be noticed in Figs. 2 and 3 that there is a limited free space $a$ between head C and nut 4 for the hub 3 to play in endwise, and this is purposely so made as hereinafter fully explained.

The friction member proper of this clutch mechanism is the ring E, which is beveled laterally about its periphery substantially as shown and adapted to engage a correspondingly-beveled surface within the periphery and edge of the pulley B, and has a hub 7 sleeved on the hub of the pulley, but not engaged to rotate therewith except as engagement is made through ring E. Radiating from this hub 7 and integral with ring E are several spokes or arms 8 and 9.

The spokes or arms 8 are seen most clearly in Fig. 3 and the spokes or arms 9 in Fig. 2, and the spokes 8 have each a lug or enlargement 10 at their sides, serving as engaging or bearing portions for the actuating cam-levers G. These levers are pivoted oppositely to one another between ears on the head C of sleeve C' and are of such length and construction inside of their pivot-points 12 that when they are raised by the tapered sliding collar H relatively about as seen in Figs. 2 and 3 the clutch ring or band E will be forced into engaging and working relation with pulley B. In this operation the levers G bear against lugs 10 or spokes 8, which are desirable to fill up the space between lever and spoke. Otherwise the inner ends of the said cam-levers would have to be unduly extended to reach said spokes or the spokes curved to get contact. When collar H is moved outward or away from the clutch, the levers G are forced in toward the shaft A by means of the springs 15, hereinafter described. As this occurs the mechanism associated with spokes or arms 9 comes into play. Thus it will be seen that the said spokes 9 are perforated near their base for the passage of rods K, which are secured in opposite corners of the head C at one end and project through the base of spokes 9 at the other end. Springs 15 encircle the inner exposed ends of the rods K and a head 16 on each of said rods serves to confine the springs. These springs are strong enough to force the clutch-ring E out of engagement with the pulley B the instant that locking pressure through levers G and collar H is withdrawn, and the said springs serve to carry the clutch member bodily over toward head C when this occurs. In this operation, however, and by reason of the peculiar construction and relation of the parts, as shown, the pulley B may itself be drawn over against head C and away from nut 4 before disengagement of clutch-ring E occurs, because the engagement of the clutch necessarily is so close that the pulley may slide on its bearings more easily than the clutch E will release its frictional engagement with the pulley. Furthermore, this room is necessary for adjustment endwise in case of wear and to give at least limited play longitudinally on its bearings for the pulley, thereby insuring more effective lubrication than would occur if rotation were confined strictly to one place.

It will also be observed that the room at $a$ is such that after sleeve 3 strikes head C the hub 7 of the clutch-ring has still further room to slide before it strikes the head C, and this further movement insures the release of the clutch, even if this does not at once occur when pressure through lever $g$ is withdrawn.

It will also be seen that the arrangement of parts C, E, and K is not only novel but highly advantageous in operation. Hitherto the springs for actuating the movable friction member E have been interposed between said member and the pulley and the push was not only on both initially when they were being separated to disengage but necessarily and naturally the push apart continued after separation occurred. Consequently it follows that there would be unavoidable wear and the pulley was soon liable to get out of reach for effective frictional engagement. Now referring to our improved arrangement it will be seen that this objection is wholly overcome because the springs 15 have no connection whatever with the pulley, but instead are arranged to take their bearing from the head C on the sleeve C'. This causes the springs to force together two parts that necessarily rotate together and hence sustain no intermediate wear and leaves the pulley entirely free from all spring-pressure when running idle. When employed, all parts are locked together and of course then there can be no end wear.

Another feature of the invention is the means shown for lubricating the pulley-bearing. Referring to Figs. 4 and 5 it will be seen that the sleeve C' has a longitudinal lubricating-channel 20, provided with a threaded plug 21 at one end to close the same from without, and the sleeve D has a narrow longitudinal slot opening into this channel. A lubricating-wick 22 is supported in this slot and channel and its outer exposed edge rests against hub 3 and communicates oil thereto, whereby the pulley-bearing is effectually oiled while the means for doing so are protected from the outside atmosphere and possible entrance of dust. By this arrangement the bearings can be oiled without throwing off the belt. The said channel 20 is of such width as to leave plenty of room for oil on both sides of the wick.

What we claim as new, and desire to secure by Letters Patent, is—

1. A shaft and a sleeve fixed to rotate therewith, a pulley free to rotate on said sleeve, a friction-wheel free to rotate on the hub of said pulley, engaging mechanism between said wheel and said sleeve, and springs connected with said sleeve, in position to disengage the friction-wheel from the pulley, substantially as described.

2. In friction-clutches, a shaft and a sleeve fastened directly on the shaft to rotate therewith and having at one end a lateral projection rigid therewith, a friction-wheel on said sleeve and spring-pressed connections for the said friction-wheel between the same and said lateral projection, whereby the friction-wheel is disengaged from the pulley, a pulley free to rotate on said sleeve, and means to force said friction-wheel into engagement with said pulley, said means comprising levers pivoted on said sleeve, substantially as described.

3. In a friction-clutch, a shaft and a sleeved member fixed to rotate therewith and having a lateral projection at one end, a pulley on said sleeve and a friction-wheel between said pulley and said projection, rods fixed in said member and parallel to said shaft and having said friction-wheel in a sliding relation thereon, and springs on said rods to disengage said wheel, substantially as described.

4. The mechanism described, comprising the shaft and the sleeve rigid therewith, in combination with the pulley free on said sleeve, the friction-wheel supported on the hub of said pulley, means to press said wheel into engagement with the pulley, driving mechanism connecting the said wheel with the aforesaid sleeve, and springs to disengage the said wheel supported from said sleeve, substantially as described.

5. The parts described consisting of a shaft and a sleeve fixed to rotate therewith and having a laterally-projecting portion at one end and a pulley free on said sleeve, in combination with a friction-wheel, rods rigid with the said lateral projection engaging said friction-wheel in a sliding relation, and springs on said rods to carry said wheel away from the pulley when the wheel is released, whereby the pulley is kept free from frictional action by said springs, substantially as described.

6. The shaft and the sleeve thereon having a laterally-projecting portion at one end and a nut engaged on the other end, in combination with a pulley free to rotate on said sleeve and having a hub of less length than the length of the bearing therefor, a friction-wheel sleeved on the hub of the said pulley, actuating parts connecting the friction-wheel with the said sleeve, releasing-springs behind said wheel and mechanism for pressing said wheel into frictional engagement with said pulley, substantially as described.

Witness our hands to the foregoing specification this 1st day of May, 1896.

GEORGE C. BARDONS.
JOHN G. OLIVER.

Witnesses:
H. T. FISHER,
H. E. MUDRA.